A. HUFFMAN.
TRACTION CHAIN.
APPLICATION FILED SEPT. 3, 1914.

1,165,178.

Patented Dec. 21, 1915.
2 SHEETS—SHEET 1.

A. HUFFMAN.
TRACTION CHAIN.
APPLICATION FILED SEPT. 3, 1914.

1,165,178.

Patented Dec. 21, 1915.
2 SHEETS—SHEET 2.

Witnesses
Paul M. Hunt

Inventor
A. Huffman
By
Attorney

UNITED STATES PATENT OFFICE.

ALONZO HUFFMAN, OF MUTUAL, OKLAHOMA.

TRACTION-CHAIN.

1,165,178.  Specification of Letters Patent.  Patented Dec. 21, 1915.

Application filed September 3, 1914. Serial No. 860,052.

*To all whom it may concern:*

Be it known that I, ALONZO HUFFMAN, citizen of the United States of America, residing at Mutual, in the county of Woodward and State of Oklahoma, have invented certain new and useful Improvements in Traction-Chains; and I do hereby declare the following to be a full, clear, and exact description of the invention, such as will enable others skilled in the art to which it appertains to make and use the same.

This invention relates to new and useful improvements in traction chains, and has for its principal object to provide a chain which will materially increase the tractive power of motor vehicles.

Another object of the invention is to provide a device which may be attached to any type of motor vehicle without materially changing the construction thereof.

A still further object of the invention is to provide a chain which will have the maximum amount of bearing surface on the ground, and thereby materially increase the tractive force of the vehicle.

Still another object of the invention is to provide a traction chain formed of a plurality of links which are constructed in such a way as to give the maximum amount of strength and durability.

With these and other objects in view, the invention consists in the combination and arrangement of parts which will be fully set forth in the following specification and in the accompanying drawing, in which:—

Figure 1:
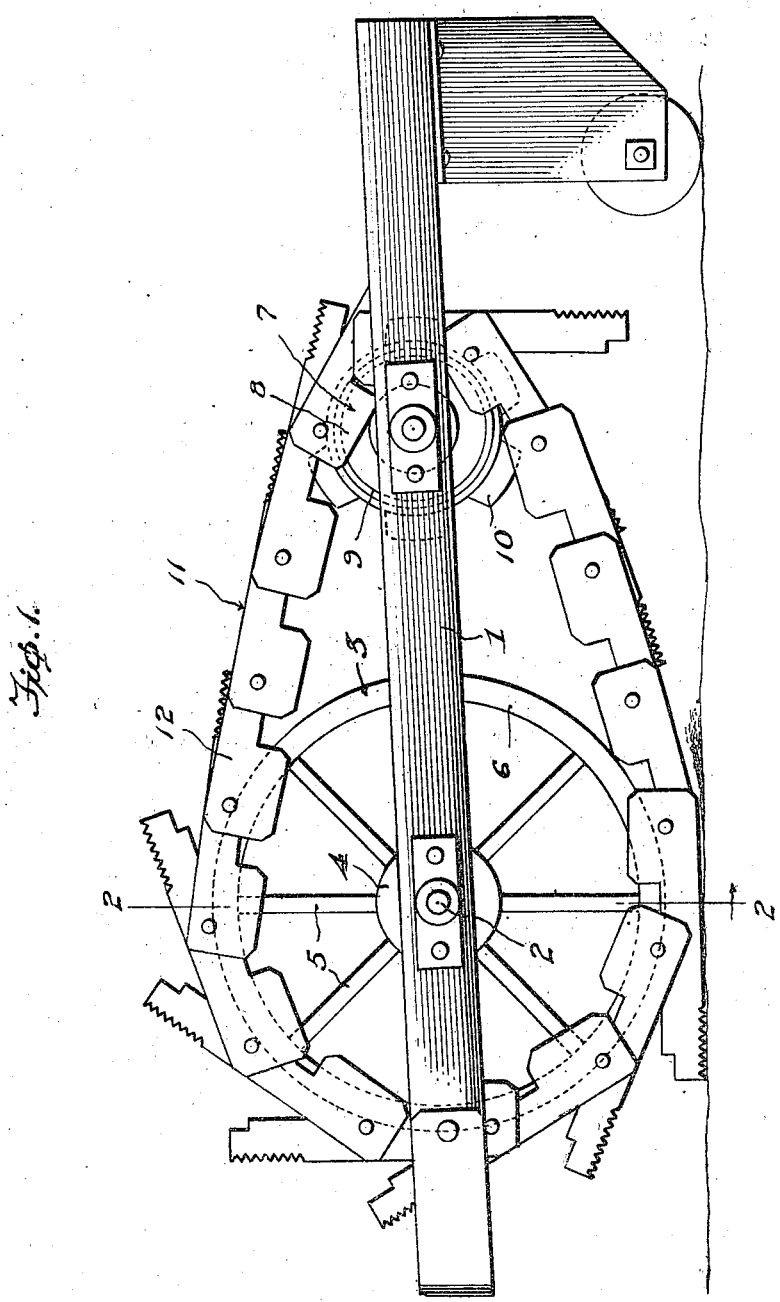
Figure 2:
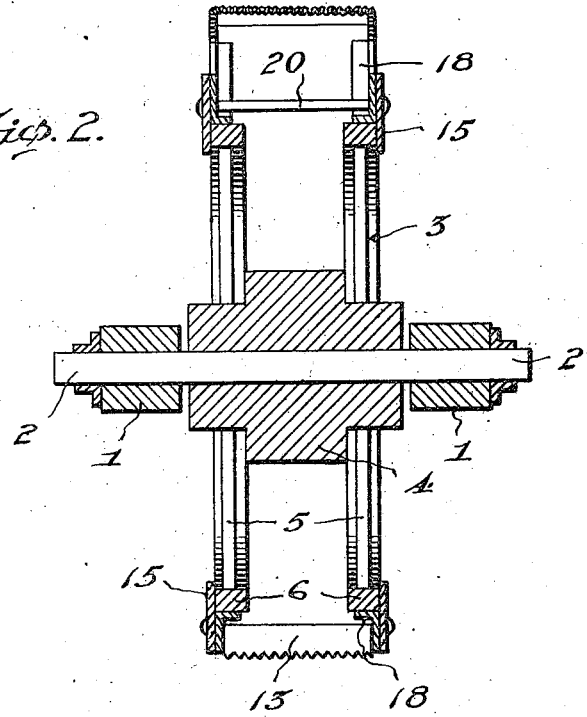

Figure 1 is a side view in elevation of a traction chain constructed in accordance with this invention showing the same as it would appear when in use. Fig. 2 is a transverse sectional view taken on line 2—2 of Fig. 1 and looking in the direction of the arrows, and Fig. 3 is an enlarged detail sectional view of one of the links.

Referring now to the drawings by characters of reference, the numeral 1 designates the frame of the device upon which the chain is used in which the axle 2 is secured. Rotatably mounted on the axle is the wheel 3 which comprises the hub 4 having a plurality of spokes 5 radiating therefrom. These spokes 5 carry at their outer ends the rims 6, which rims are spaced from each other and form the bearing section upon which the traction chain runs.

Rotatably mounted in the frame is the drive wheel 7 which comprises the cylindrical body 8 having at its ends the rings 9 of leather or a similar material. Intermediate the ends of the cylindrical body 8 are the teeth 10, which may be formed in any desired manner, these teeth are in spaced relation as clearly shown in Fig. 1, and are arranged to coöperate in driving the chain.

Figure 3:
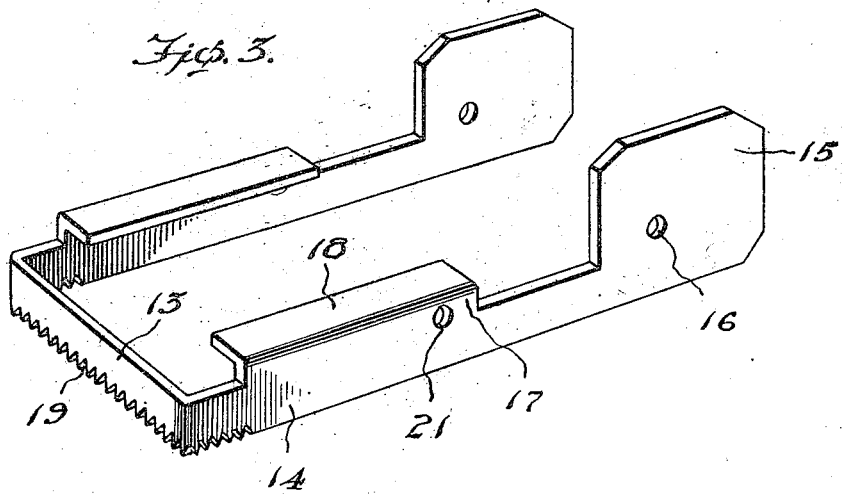

The traction chain hereinbefore mentioned is designated generally by the numeral 11 and comprises a plurality of links 12 which are best illustrated in Fig. 3. Each of these links comprises the body 13 having formed at each end the angular extensions 14 which coöperate with each other, and with the body in forming a U-shaped member. The free ends of the arms 14 are enlarged as at 15 and provided with the apertures 16 the use of which will appear as the description proceeds. Extending upwardly from the arms 14 near the body 13 are the flanges 17 which terminate at their upper edges in the angular flanges 18. The body is provided at its lower edge with a plurality of teeth 19, and these teeth extend partially up the arms 14 as shown in Fig. 3. In order to specifically connect the links together in order to hold the same in operative position, there are provided a plurality of rivets or bolts 20 which are arranged to extend through the apertures 16 and the apertures 21 which are formed in the flanges 17 near the end adjacent the enlargement 15.

It will be apparent from the foregoing, that in use the device is assembled as illustrated in Fig. 1, and in this position the bolts or rivets 20 will not only serve to hold the links in operative position but will also be engaged by the teeth 10 of the drive wheel 7 and act to transmit the power positively through the chain.

While in the foregoing there has been shown and described the preferred embodiment of this invention, it is to be understood that such changes in the combination and arrangement of parts as may fall within the scope of the claims may be resorted to without departing from the spirit and scope of the invention.

Having thus described the invention, what is claimed as new, is:—

1. A traction chain link comprising a substantially U-shaped body, the arms of said body provided with upwardly projecting flanges intermediate their ends, inwardly extending flanges formed on the upper terminals of said projections, said upwardly extending flanges provided with apertures adjacent one end thereof, enlargements formed at the free ends of the arms of the body, said enlargements provided with apertures therethrough, and teeth formed on the under surface of the body at the bight portion thereof adapted to engage the ground when in use.

2. A traction chain including a plurality of substantially U-shaped links, enlargements formed at the free ends of the arms of the U-shaped links, said enlargements provided with apertures, said links also being provided with apertures intermediate the ends, upstanding flanges formed on said arms intermediate their ends, inwardly extending flanges formed on the upper terminals of said upstanding flanges, and extending toward one another, and rivets extending through the apertures of the enlargements in the intermediate apertures of the following links, said rivets also forming means to engage the teeth of the power transmitting wheel and thereby drive the chain, and teeth formed on the under surface of a bight portion and arms of said links to engage the ground when in use.

In testimony whereof I affix my signature in presecnce of two witnesses.

ALONZO HUFFMAN.

Witnesses:
L. A. FOSTER,
NINA L. FOSTER.

Copies of this patent may be obtained for five cents each, by addressing the "Commissioner of Patents, Washington, D. C."